(12) United States Patent
Wilson et al.

(10) Patent No.: US 9,708,067 B2
(45) Date of Patent: Jul. 18, 2017

(54) SEAT CUSHION FOR USE BY AIRLINE PASSENGERS

(71) Applicants: Susan L. Wilson, San Jose, CA (US); Curtis L. Landi, San Jose, CA (US)

(72) Inventors: Susan L. Wilson, San Jose, CA (US); Curtis L. Landi, San Jose, CA (US)

(73) Assignee: SUPRACOR, INC., San Jose, CA (US)

( * ) Notice: Subject to any disclaimer, the term of this patent is extended or adjusted under 35 U.S.C. 154(b) by 0 days.

(21) Appl. No.: 14/972,083

(22) Filed: Dec. 16, 2015

(65) Prior Publication Data

US 2017/0174346 A1 Jun. 22, 2017

(51) Int. Cl.
*B64D 11/06* (2006.01)
*A47C 31/00* (2006.01)

(52) U.S. Cl.
CPC ........ *B64D 11/0647* (2014.12); *A47C 31/001* (2013.01)

(58) Field of Classification Search
CPC ............ B64D 11/0619; B64D 11/0647; B64D 11/0648; B64D 11/064
See application file for complete search history.

(56) References Cited

U.S. PATENT DOCUMENTS

| | | | | |
|---|---|---|---|---|
| 4,031,579 A | * | 6/1977 | Larned | A47C 7/746 297/219.11 |
| 4,522,447 A | * | 6/1985 | Snyder | A47C 7/022 297/452.27 |
| 5,203,607 A | * | 4/1993 | Landi | B62J 1/26 297/214 |
| 6,142,563 A | * | 11/2000 | Townsend | B60N 2/4228 297/216.1 |
| 6,901,617 B2 | * | 6/2005 | Sprouse, II | A47C 4/54 297/219.1 |
| 7,717,520 B2 | * | 5/2010 | Boren | B64D 11/06 297/216.1 |
| 7,871,039 B2 | * | 1/2011 | Fullerton | B60N 2/7011 244/118.5 |
| 8,793,821 B2 | * | 8/2014 | Fowkes | A47K 3/002 4/578.1 |

* cited by examiner

*Primary Examiner* — Philip Gabler
(74) *Attorney, Agent, or Firm* — Hamrick IP-Law Office; Claude A.S. Hamrick

(57) ABSTRACT

An aircraft seat cushion, combining comfort, durability as well as passenger protection and maneuverability under extreme conditions is provided in accordance with the present invention. The main constituent elements of the subject seat cushion may be effectively combined in a number of configurations. For example, a typical seat cushion configuration may have one or more base or bottom layers of foam or other traditional seat cushion forming materials or alternatively, of a resilient honeycomb material, and have one or more upper layers of resilient energy absorbing honeycomb material which may be considered the main cushioning layer. The cushion may be enclosed in an enveloping cover of fabric or other suitable material.

20 Claims, 9 Drawing Sheets

SEAT CUSHION FOR USE BY AIRLINE PASSENGERS

BACKGROUND OF THE INVENTION

Technical Field

The present invention relates in general to aircraft passenger comfort components, and more particularly, to improvements in aircraft passenger seating cushions and the like.

Prior Art

Commercial aircraft have historically utilized a variety of passenger seating configurations and designs historically using heavy and bulky materials that satisfy certain structural design and passenger comfort requirements. However, since the amount of legroom and personal space in a commercial aircraft influences the overall comfort of the passenger, the bulky materials and thick padding normally utilized in conventional aircraft passenger seats consume precious cabin space that could otherwise be used for increased legroom, or in the aggregate, to allow for additional rows of seats. Such bulky materials have long been considered necessary for structural support and thick padding has often been deemed necessary to provide sufficient cushioning for the seated passengers.

More recently, commercial aircraft design has placed extreme importance on the benefits of lightweight components and other desirable features that can improve passenger comfort and convenience. This is particularly apparent in aircraft seat design because the aircraft is typically configured with hundreds of such seats, and customer comfort is of paramount concern.

Over the years, conventional economy class seat cushion designs have relied almost completely on foamed rubber cushioning schemes which suffer from a variety of shortcomings, including compromises made between durability and comfort. In the seating scheme of a typical airplane, the thickness and density of the foams used in the cushion and backrest are carefully balanced between passenger comfort and the overall weight of the seat cushion.

Prior conventional seat design approaches, particularly for economy seating, attempted to improve seating cushions by allocating different foam densities and types to specific regions of the cushion. The desire to relieve pressure and discomfort related to long term sitting was hopefully achieved by judicious selection and positioning of the various foam materials, but this alone was insufficient to enhance safety and maneuverability in a hard landing situation.

Varying the variety and quantity of foam cushioning materials can yield improvements in comfort, but this will not necessarily furnish a meaningful or substantial improvement. Furthermore, the reliance on foam as the sole supporting element of a relatively comfortable seat cushion generally means that such foam will lack sufficient durability required for long in-service life and will offer little in the way of safety and maneuverability improvements.

Aircraft cushions have heretofore not included a component specifically designed to isotropically flex and spread forces incurred in the specific and tightly controlled load conditions experienced in a hard landing. The present invention specifically addresses such loads and thereby enhances passenger safety by absorbing sudden energy spikes under emergency situations. The resilient honeycomb materials used in accordance with the present invention minimize the transfer of large energy spikes to the legs, pelvis and spine of a seated passenger, and thus tend to reduce the likelihood of disabling injury and thereby improve the passenger's mobility in situations requiring rapid emergency egress.

The new cushion designs of the present invention thus provide enhanced comfort levels, meet all anthropometric seating requirements and at the same time improve passenger safety. These improvements to seat cushion design can be readily incorporated into modern aircraft seat support configurations, as well as other conventional seat support design configurations. With the subject seat cushion design to be described hereinbelow, even an economy class seat can be enhanced in terms of safety, comfort and weight. The improved embodiments also offer additional design choices to aircraft purchasers by improving this important aspect of seating.

These improvements are achieved, in part, by utilizing resilient honeycomb, energy-absorbing padding materials either exclusively or in combination with traditional foam components. In the latter case, the resilient energy-absorbing honeycomb materials combine with the foam or other seat cushion materials and serve to reduce the forces that may be transferred from a seat support structure to the spine, pelvis and femurs of the passenger during a hard landing, and even enhance the passenger's ability to rapidly exit the aircraft in some emergency situations. The use of applicants' unique honeycomb materials thus serves to improve passenger safety and maneuverability in hard landing scenarios.

It will thus be appreciated that the subject improved cushion design also achieves enhanced comfort and an improved margin of safety through its unique use of resilient honeycomb padding materials and element shapes and configurations.

Accordingly, an important objective of the present invention is to provide an improved passenger seat cushion for aircraft applications.

A further objective of the present invention is to provide a passenger seat cushion design having an improved combination of comfort and safety features.

Other desirable features and characteristics of embodiments of the present invention will become apparent from the following descriptions and the appended claims, taken in conjunction with the accompanying drawings and the foregoing background discussion.

BRIEF SUMMARY

An aircraft seat cushioning design combining comfort and durability, as well as passenger protection and maneuverability under extreme conditions, is provided in accordance with the present invention. The constituent elements of the subject seat cushion may be effectively combined in a number of configurations. For example, a particular seat cushion configuration may comprise a single layer of resilient energy absorbing honeycomb material trimmed or molded into a particular configuration, or a configuration comprising one or more bottom layers of foam or other traditional seat cushion forming materials, or even a resilient honeycomb material, and one or more upper layers of resilient energy absorbing honeycomb material which may be considered the main cushioning layer.

In the latter case, the upper layer(s) may consist of a single pad of resilient energy absorbing honeycomb material that covers the entire upper surface of the underlying bottom layers, or it may include a plurality of segments of resilient energy absorbing honeycomb material arrayed along the front, sides and/or back of the main layer. The several segments may have supporting and/or flexing characteristics different from the more centrally disposed pad layer. Furthermore, the front edge of the upper pad layer may extend beyond and be wrapped over the front edge of the underlying bottom layer(s).

Although principal ishial support and protection for the passenger may be provided by a specifically shaped part of the single layer embodiment, or by the underlying bottom layer in the multiple layer configuration, the upper pad may also include an additional ischial insert component integrally formed therein or disposed within an appropriately configured portion of the upper layer or another underlying honeycomb layer. The ischial insert would serve to provide additional comfort to the passenger's large lower pelvic bones, as well as providing additional protection in the event of hard landings. Such insert may be made of resilient energy absorbing honeycomb material having the same or different cushioning characteristics as compared to the upper layer and/or lower layer. The cushion assembly may be completed with a finishing covering of fire resistant fabric or upholstery of a type typically used to cover the entirety of the cushion.

If used, any bottom layer(s) of cushioning foam will be selected from among conventional comfort foams, memory foams, low density foams and similar cushioning materials. As is well known, these materials are varied and selected to combine an optimum combination of comfort, durability and weight savings as may be desired in a specified seating design. These materials are generally made of rubber or plastic foams including polyurethane. Non-foam materials may also be utilized but are less preferred choices.

The principal energy-absorbing upper layer of the embodiment is comprised of resilient energy absorbing honeycomb plastic material preferably of the type made by SUPRACOR® Inc., of San Jose, Calif. and sold under the trademark Stimulite®.

As alluded to above, an embodiment of the present aircraft seat cushioning system may comprise multiple layers of resilient energy absorbing honeycomb material stacked in a cushioning array. There may be a bottom layer or pad of firm energy honeycomb or other energy absorbing material; a next layer of honeycomb having different support characteristics; an ischial insert of honeycomb or other cushioning material placed atop the main cushioning layer; and perhaps a softer upper comfort layer placed atop the other elements. The same component materials may be utilized as in the earlier described embodiment and the cushion may be finished with a full or partial covering of fire blocking fabric or upholstery.

IN THE DRAWING

Figure 3:
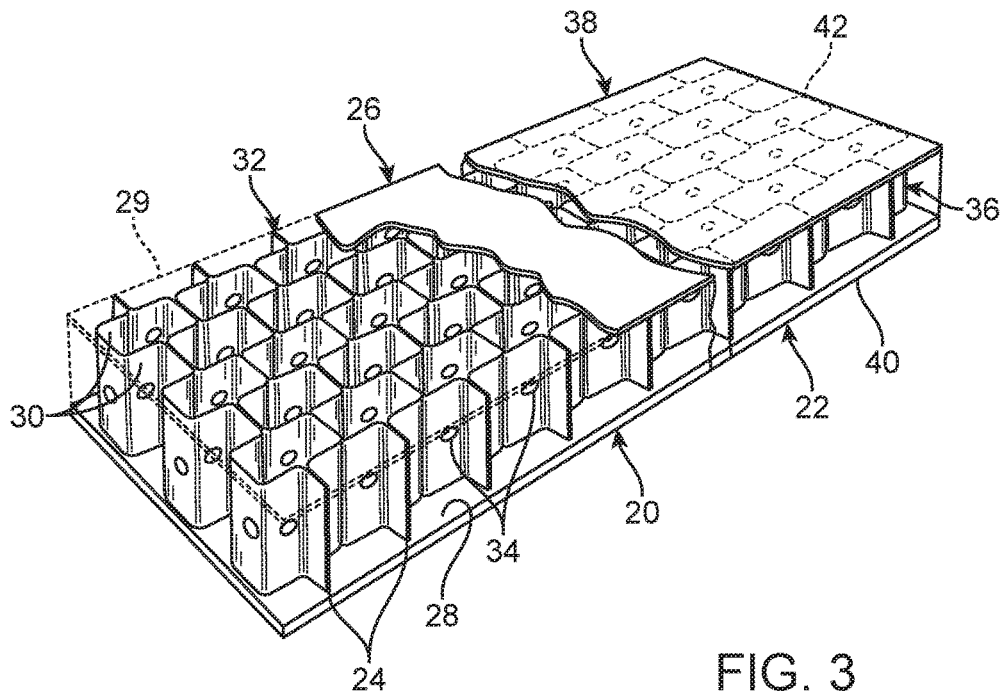
Figure 4:
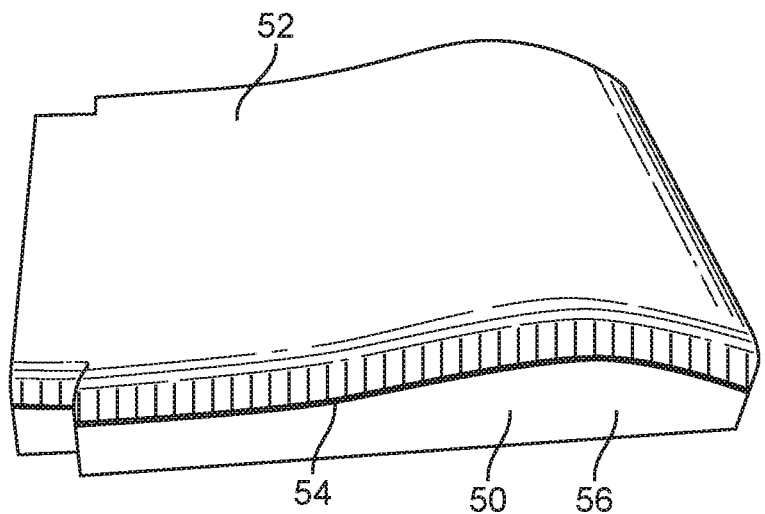
Figure 5:
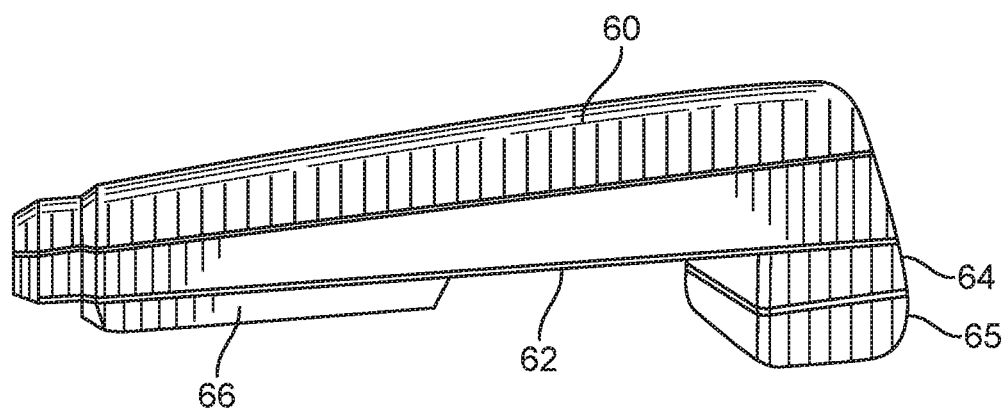
Figure 6:
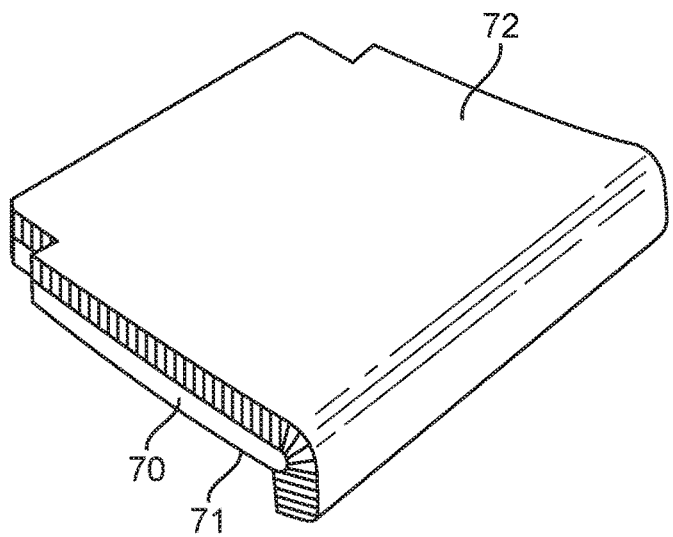
Figure 7:
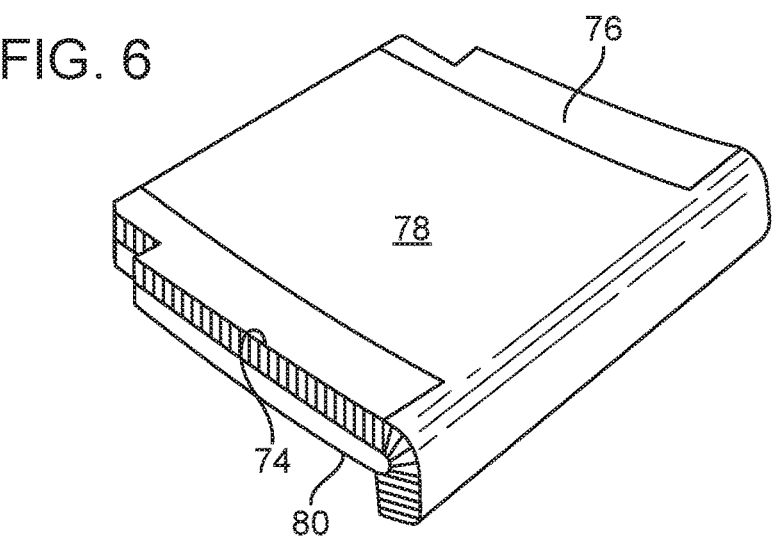
Figure 8:
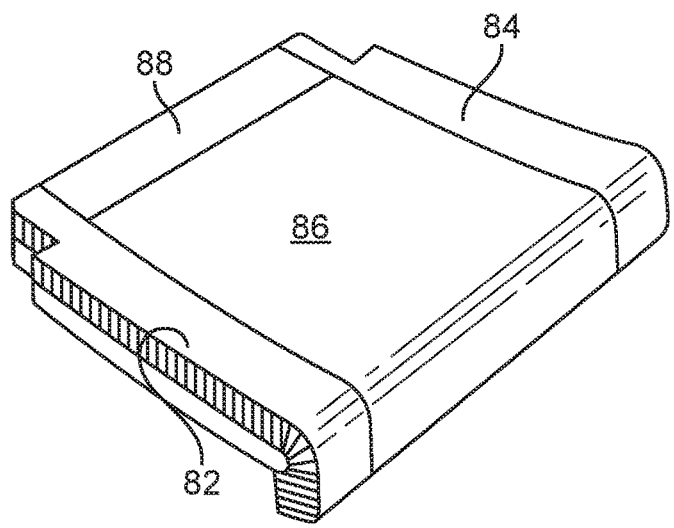
Figure 9:
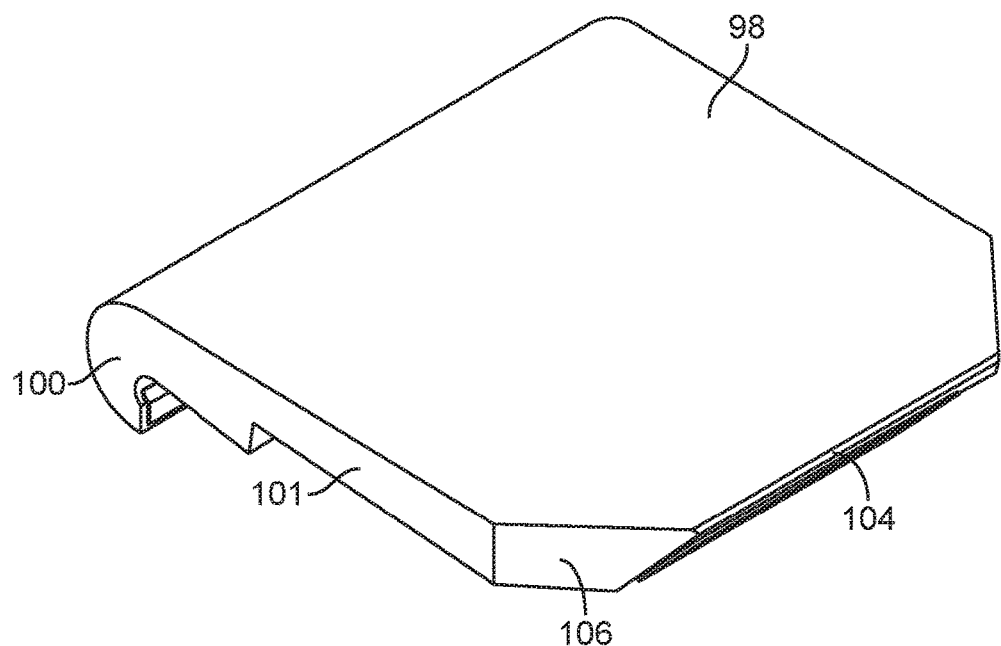
Figure 10:
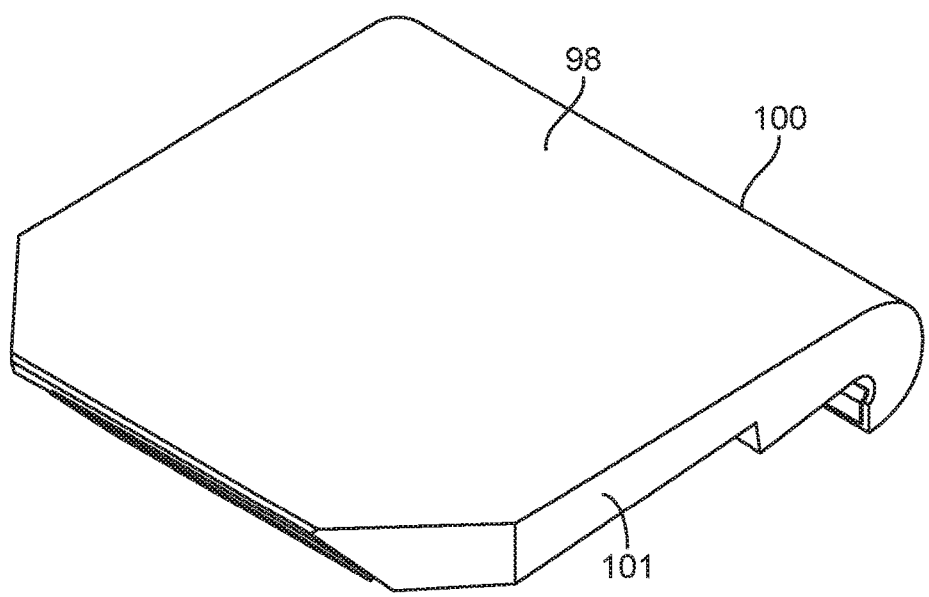
Figure 11:
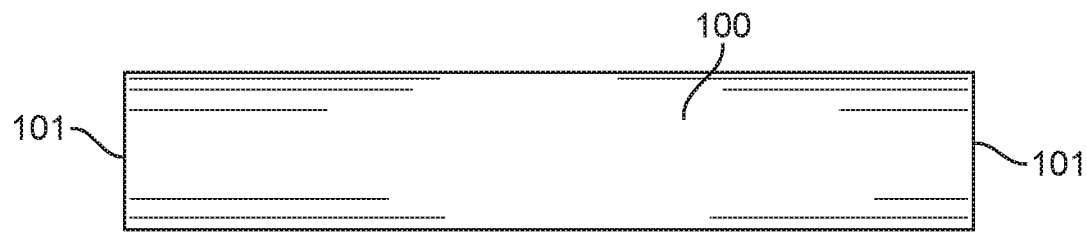
Figure 12:
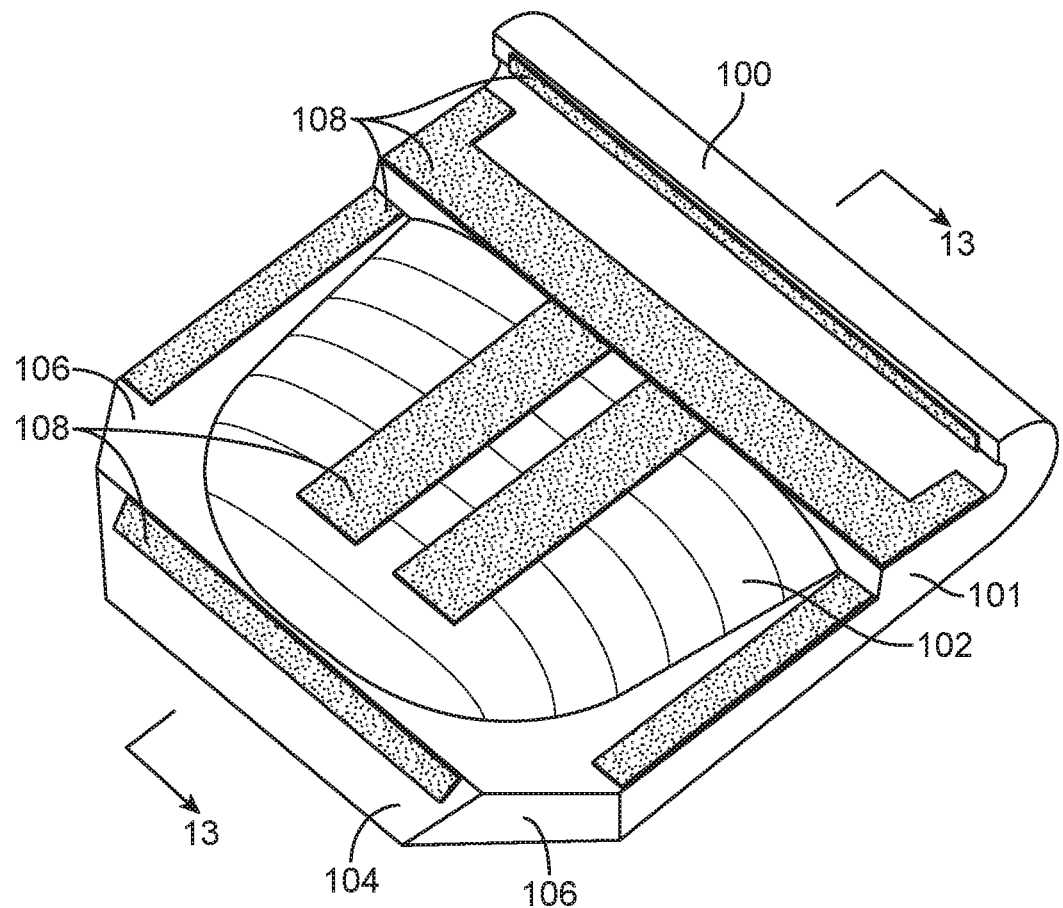
Figure 13:
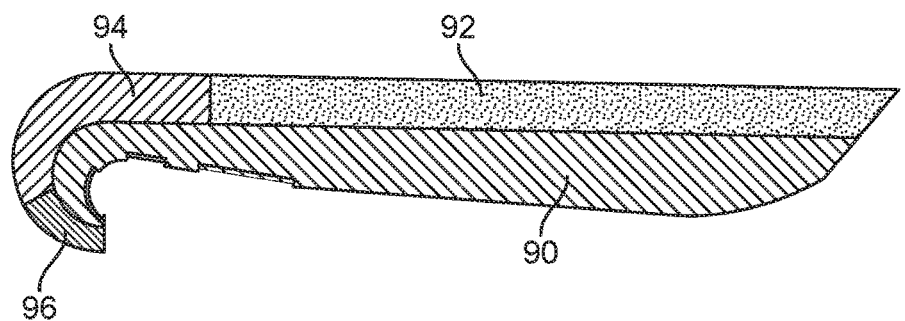
Figure 14:
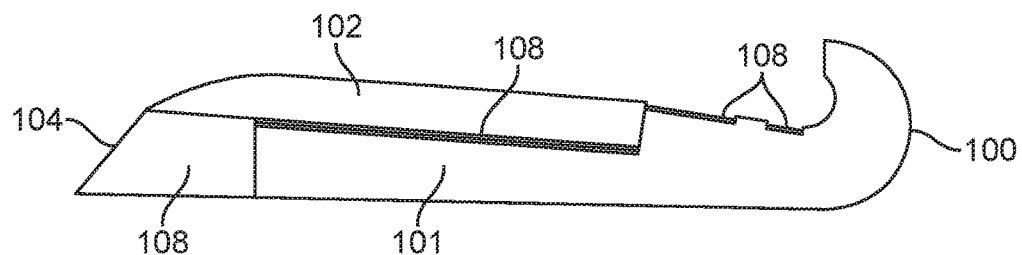
Figure 15:
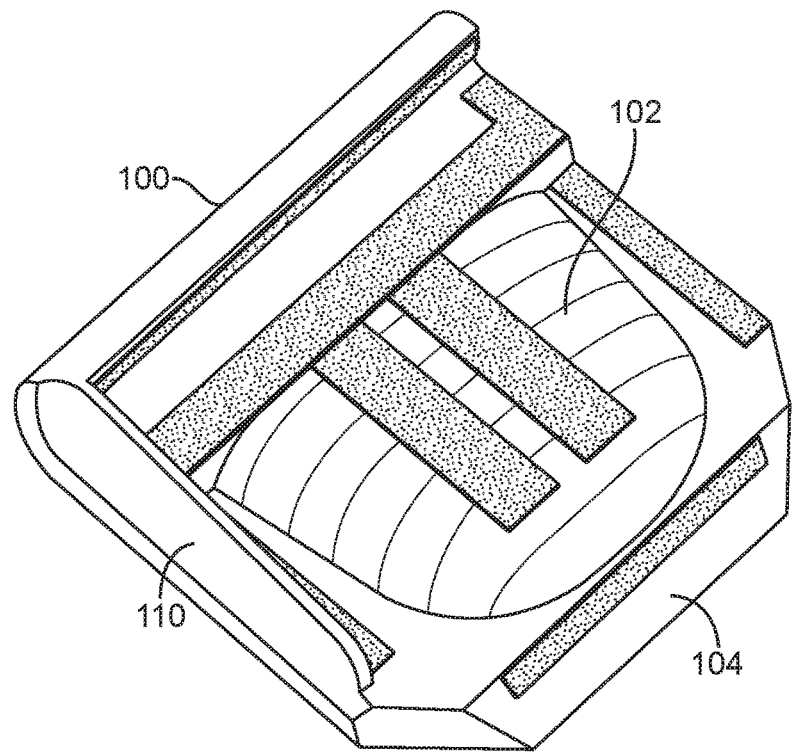
Figure 16:
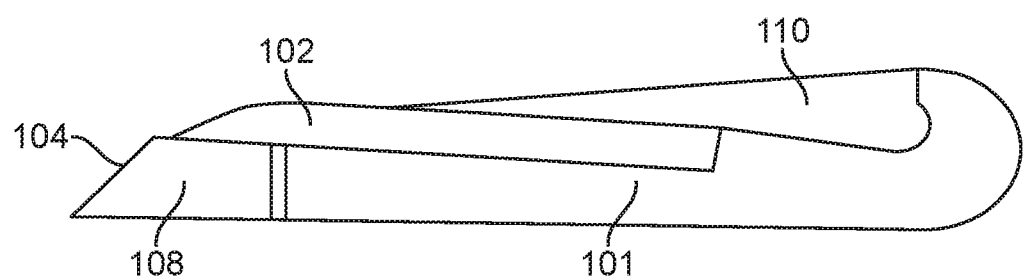
Figure 17:
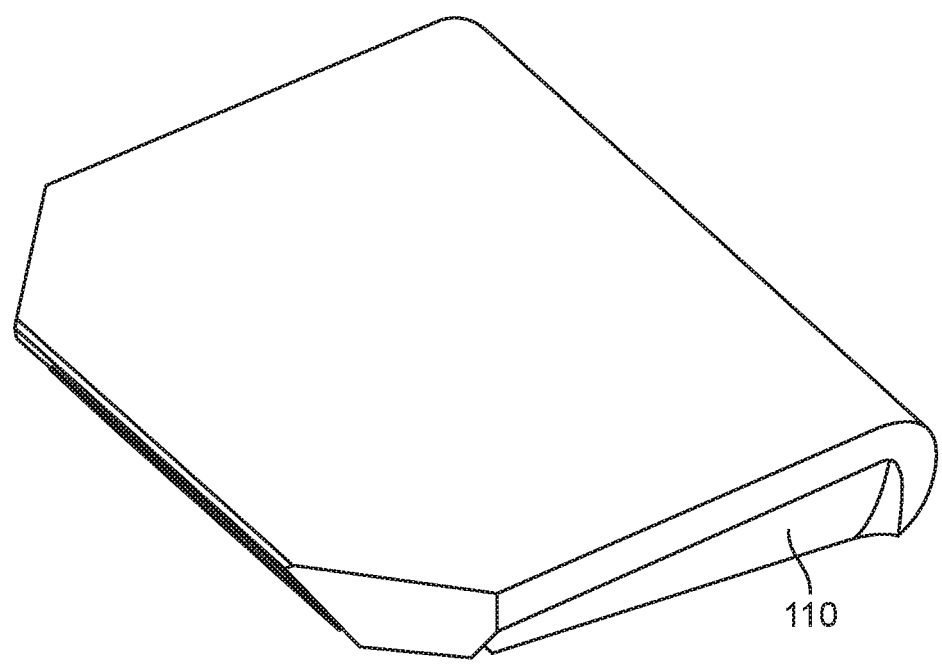
Figure 18:
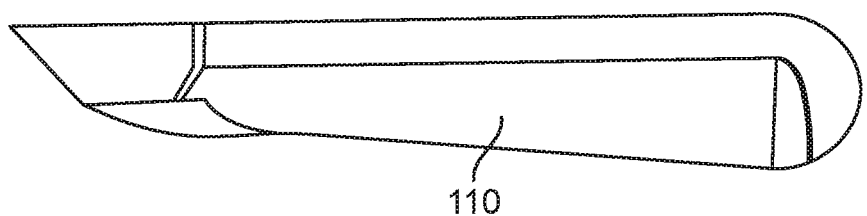
Figure 19:
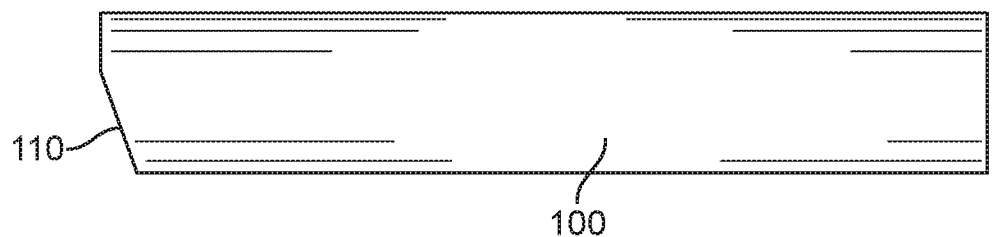
Figure 20:
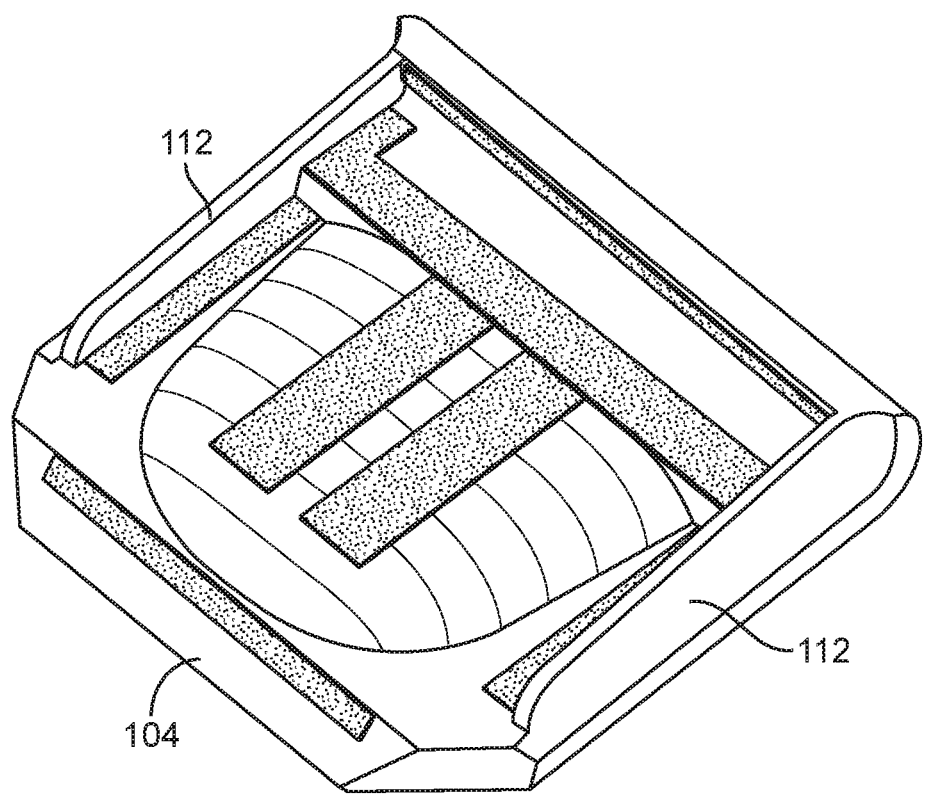
Figure 21:
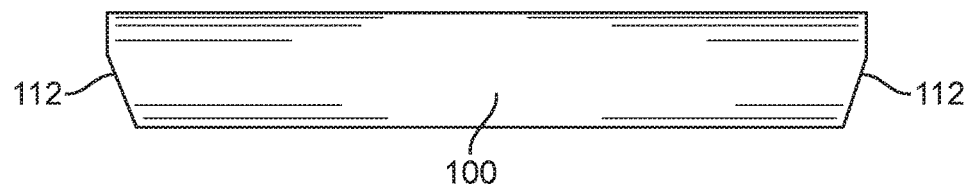
Figure 22:
Figure 23:
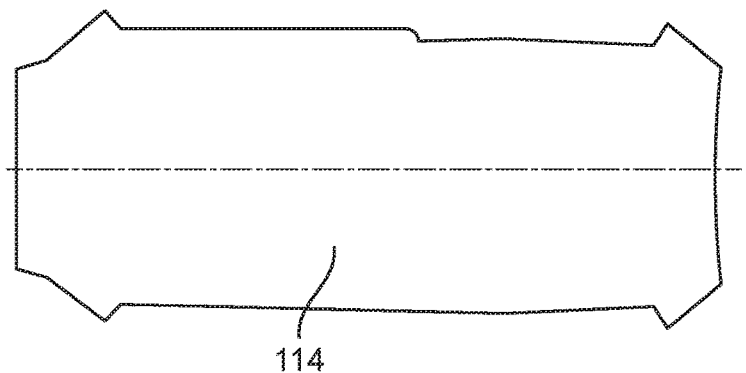
Figure 24:
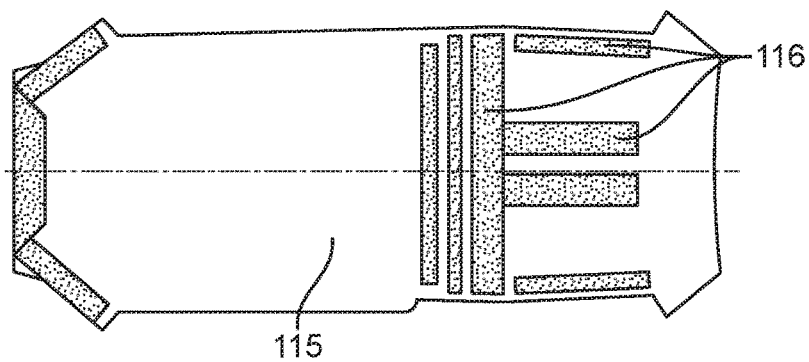

FIG. 3 simultaneously illustrates an example of two types of resilient honeycomb, one having perforated interior cell walls and another having additional perforations in an upper covering plastic sheet adapted to enhance the circulation of air through the cushion;

FIG. 4 shows a second configuration of a single honeycomb layer cushion configured to provide additional support to a passenger's thighs;

FIG. 5 illustrates an alternative embodiment made up of several layers of resilient energy absorbing honeycomb material having different support characteristics as well as an underlying ischial support pad element adapted to fit into some types of seat pad supporting structures;

FIGS. 6-8 show additional alternative configurations of honeycomb pads combined to provide different support characteristics;

FIGS. 9 and 10 are perspective views respectively illustrating the top rear and sides of an alternative embodiment of a cushion in accordance with the present invention adapted to fit onto and be removably secured to a particular type of aircraft seat support system;

FIG. 11 is an elevational view of the front of the cushion shown in FIGS. 9 and 10;

FIG. 12 is a perspective view showing the bottom surfaces of the cushion illustrated in FIGS. 9 and 10;

FIG. 13 is a cross-section taken along the line 13-13 of FIG. 12;

FIG. 14 is an inverted side elevational view of the embodiment of FIGS. 9, 10 and 12;

FIG. 15 is a perspective view showing the bottom surfaces and side wall of an alternative embodiment of the present invention;

FIG. 16 is an inverted right side elevational view of the embodiment of FIG. 15;

FIG. 17 is a perspective view showing the top surface and side wall of the alternative embodiment of FIG. 15;

FIG. 18 is an elevational view illustrating the left side of the embodiment of FIG. 17;

FIG. 19 is an elevational view of the front of the cushion shown in FIG. 17;

FIG. 20 is a perspective view showing the bottom and side walls of another alternative embodiment of the present invention;

FIG. 21 is an elevational view of the front of the cushion shown in FIG. 20;

FIG. 22 is an inverted elevational view showing the left side wall of the embodiment of FIG. 20; and FIGS. 23 and 24 respectively illustrate a fireblock cover adapted to envelope the cushion illustrated in FIG. 20.

DETAILED DESCRIPTION OF THE EMBODIMENTS

Figure 1:
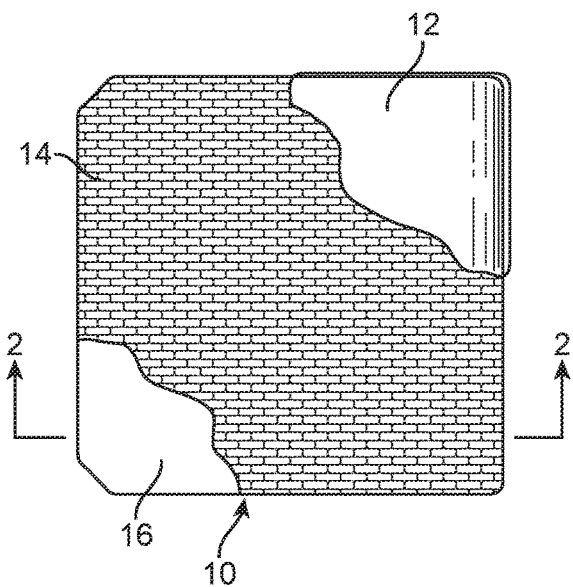
FIG. 1 is a partially broken, simplified plan view of an embodiment of an aircraft seat cushion having an upper layer of resilient energy absorbing honeycomb material of the type contemplated by the present invention.
Figure 2:
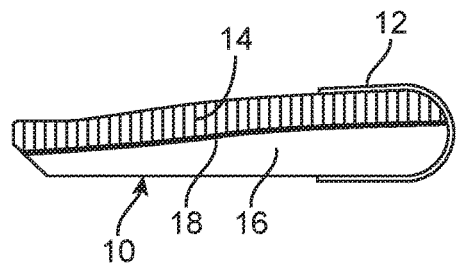
FIG. 2 is a longitudinal cross section taken along the line 2-2 of FIG. 1 and showing a typical layer of foam or other cushioning material covered with a more comfortable layer of resilient energy absorbing honeycomb material.

Referring now to FIGS. 1 and 2 of the drawing which are respectively plan and cross sectional views of a simplified embodiment of the present invention, FIG. 1 shows a top view of an airliner seat cushion 10 with its outer fabric cover or envelope 12 removed in part to reveal an underlying layer of honeycomb padding schematically represented at 14. Between the outer dress cover a layer of woven or fabric Nomex of Kevlar fireblock material (not shown) may be affixed to either or both of the cover and honeycomb padding. (In subsequently described embodiments the outer cover will, for convenience of description, not be shown.) The upper padding provides a "comfort" layer 14 that overlies and is secured by bonding, gluing, Velchro strips, etc., to a base layer 16 suitably configured such that its bottom surface mates with a conventional airliner seat pan (not shown).

Note in the cross section shown in FIG. 2 that the thickness of the layer 16 increases back to front to cause the cushion to be thicker at its front than at its rear to lessen the tendency of the user to slide forward on the cushion. The upper surface of layer 16 is preferably contoured to combine with the overlying honeycomb layer (or layers) to provide a desired contour to the top of the cushion. The relative thicknesses of the layers 14 and 16 are illustrated by the cross section.

The base layer 16 is of conventional construction and made of a foam material selected from among conventional comfort foams, memory foams, low density foams and similar cushioning materials. As is well known, these materials are varied and selected to combine an optimum combination of comfort, durability and weight as may be desired in a specified seating design. These materials are generally rubber or plastic foams including polyurethane. One such material is marketed under the trade name NOMEX®, and may be used in either open cell or closed cell form. Non-foam cushions may also be utilized but are less preferred choices. However, as will be described below honeycomb materials can also be used as the base layer.

The upper layer is constructed of at least one flexible thermoplastic elastomeric honeycomb core panel built in accordance with the present invention and is preferably bonded or otherwise secured to the foam base layer 16 using a suitable mastic, thermal bonding technique or other means off attachment. The cushion may be secured to the under lying support structure by any suitable means, but the use of Velchro® strips is preferred in that it allows easy attachment and simple removal for cleaning. It should be noted that although the cushion 10 is particularly well suited for aircraft seat applications, a similar construction may also be used in a variety of other vehicle applications (e.g., automobile seats, train seats, truck seats, bus seats, etc.).

FIG. 3 illustrates two variations of honeycomb panel structures 20, 22 constructed from thermoplastic elastomeric materials. The panels includes a honeycomb-like core 23, 25 preferably made of bonded together and expanded strips or ribbons 24 of flexible resilient plastic material to which facing sheets 26 and 28 of either thinner or heavier gauge material are thermo-compression bonded. The panels are anisotropic three-dimensional structures having predetermined degrees of flex along all three orthogonal axes. Each cell 30 is formed, in part, by four generally S-shaped wall segments each of which is shared by an adjacent cell. In addition, each cell shares a double thickness wall segment with two adjacent cells.

The illustrated panel is broken into two sections, a left hand section 20 and a right hand section 22 in order to illustrate alternative embodiments. The left section 20 shows an embodiment having a perforated honeycomb core 32 and unperforated or solid upper and lower facing sheets 26 and 28. The dashed lines 29 illustrate the normal full coverage of the top facing sheet 26.

The core 32 is made from multiple sheets (not shown) of a selected grade of resilient thermoplastic elastomeric material that has been perforated such that a matrix of small holes exists throughout. The sheets are compression bonded together in spaced intervals staggered between alternating sheets as described in our U.S. Pat. No. 5,039,567 (incorporated herein by reference). The resulting stack of bonded sheets is then transversely cut into strips which, when expanded, create the honeycomb network of generally hexagonal shaped cells 30.

The upper and lower extremities of the walls forming the several cells are deformed during a planarization operation as disclosed in our above-identified patent to stabilize the honeycomb core and prevent the expanded strip stock from collapsing in an unintended manner. In an embodiment, facing sheets 26 and 28 cut from additional sheets of resilient thermoplastic material, are then thermo-compression bonded to the upper and lower planarized cell wall surfaces. The addition of the facing sheets 26 and 28 strengthens the core 32 and provides an ample surface for adhering another panel or other material.

However, because the panels are stabilized by planarization before the upper facing sheet is applied, the cells of at least the top level honeycomb panel(s) may be left open at the top and used without the upper facing sheet. This makes it easier to contour the top surface by shaving or otherwise trimming the top face of the core prior to performing the thermal "planarizing" operation using a heating contouring plate having the desired final contour. But even having so configured the core top, it is still possible to bond a thin perforated or non-perforated facing sheet or layer of woven fabric to the contoured core top.

The section 22 of the panel depicted in FIG. 3 on the right side of section 20 includes a perforated honeycomb core 36 similar to the left hand section of the illustrated panel, but has facing sheets 38 and 40 made of perforated material. Dashed lines 42 indicate the honeycomb pattern of the core 36 beneath the top facing sheet 38. By perforating both the honeycomb core and either or both facing sheets, the weight of the panel is reduced while the resiliency and flexibility is increased. The weight is reduced because the perforations reduce the overall quantity of the material comprising the honeycomb core and facings. In addition, the flexibility is increased because there is less material to constrain each segment of the material as it bends. The resiliency, or ability of the structure to spring back to its original form after being compressed, is also enhanced by virtue of the additional passages through which air can return to fill the cells. It will be appreciated that the resilient but damped restorative characteristics of the structure make it an excellent absorber of compressing load and shock forces.

The honeycomb panel has high tear and tensile strength and is highly resilient, with optimal compression load and shock absorption or distortion characteristics, yet is relatively light weight. Selected combinations of elastomeric material, honeycomb cell configurations, core thickness and facing material variables will determine the panel's characteristics of softness or hardness, resilient recovery rate and rigidity or flex as required for a particular application. The facing materials can be selected from a wide variety of films, including thermoplastic urethanes, foams, EVAs, rubber, neoprene, elastomer impregnated fibers and various fabrics, etc. One such fabric is a fireproof fabric made of woven NOMEX®, fibers. The manufacturing and fabrication of an embodiment of a panel is described in greater detail in our U.S. Pat. No. 5,039,567 (incorporated herein by reference).

In an embodiment, the thickness of the honeycomb layer 14 will usually range from ½ inch to 2.5 inches or more, and the cell size may typically be on the order of ¼ inch or larger.

In FIG. 4 an embodiment is illustrated in which the base layer 50 is of a foam construction and the upper layer 52 is a honeycomb pad glued or otherwise bonded at 54 to the foam layer. Note that in this embodiment the foam layer 50 is configured to be curvaceous and thicker in the front portion 56 to provide added support to the lower thigh portions of the seat occupant and at the same time reduce the tendency of the user to slide forward. Although seats of a similar configuration, but made all-foam layers, have previously been known, the use of an appropriately engineered honeycomb upper pad layer can result in an improved seat pad structure that is lighter in weight and more comfortable to the user than a corresponding all-foam embodiment. Furthermore, because the core walls and/or facing sheets of the honeycomb pad are perforated, the seat is ventilated, and thus cooler to the user. In addition, by careful choice of the honeycomb cell size and durometer of the core material, the seat can be tailored to have varying degrees of firmness and softness in specific areas thereof to suit the intended comfort level of the seat occupant.

Moreover, by use of a combination of honeycomb segments and layers having varied characteristics appropriately positioned in the upper layer or seat volume, as variously illustrated in FIGS. 5-8, different areas of the seat may be provided with different levels of support and shock absorption characteristics, more appropriate contours can be provided, and even a level of "body massaging" can be achieved as the seat occupant adjusts his seating position over the period of use. For example, these features can result in better circulation, better leg comfort and less likelihood of leg cramping during a long flight.

In FIG. 5 a perspective view showing an embodiment of a multi-layered seat pad fabricated using a plurality of honeycomb panels 60-66. This embodiment is adapted for use on a legacy seat support structure (not shown) basically comprised of a cushion supporting pan having a depressed region formed in a position along the longitudinal centerline of the cushion support and to the rear of the center thereof. The front portion of the support is also lowered to form a shelf for receiving a descending portion of the cushion proximate the front thereof. The illustrated seat cushion preferably includes at least two layers 60 and 62 of resilient honeycomb padding, a pair of laterally extending honeycomb pads 64 and 65 affixed to the underside of a front portion of the layer 62, and an ishial support pad 66 affixed to the bottom of layer 62 and positioned for receipt in the above mentioned depressed portion of the seat support structure. The dimensions, firmness and resiliency requirements of the pad 66 are typically determined by the specifications set forth by the manufacturer of the seat structure.

In an embodiment, the stiffness and resiliency of the extra pads 64 and 65 are chosen to act in concert with the characteristics of the overlying pad layers 60 and 62 to soften the front edge of the cushion in avoidance of potentially fatiguing circulation interference in the corresponding portion of the user's legs. The dimensions of the pads 64 and 65 are usually determined by the dimensions of the supporting seat shelf.

Another embodiment of a cushion in accordance with the present invention is shown in FIG. 6. In this embodiment a lower pad 70 which may be formed of either a foam material or a honeycomb material preferably having any of the characteristics of a corresponding lower pad or combination of pads described above is covered with a single honeycomb pad 72 extending from the rear cushion edge to the front and wrapping around the front edge 71 of the lower pad.

A modification of the embodiment of FIG. 6 is depicted in FIG. 7 and includes left and right side pads positioned in side cutouts of the main pad 78. In this embodiment the side pads components may have characteristics substantially different from the main pad 78 so as to enhance the conformance of the cushion to the buttocks of a user. These side pads will preferably bonded to the support pad and the main pad 78 as in previously described embodiments.

Still another exemplary embodiment of the present invention is depicted in FIG. 8. In this embodiment side pads 82 and 84 extend along the entire length of the main pad 86, and an additional pad 88 is positioned across the rear edge of the cushion between the side pads 82 and 84.

In these alternative embodiments the cell size, material durometer, upper contour configuration or other characteristics of the additional pads may be appropriately configured, and the interior or inwardly facing edges of the additional pads may be straight as depicted or may be curved in a manner suitable for achieving a particular resiliency or support objective.

Referring now to FIGS. 9-14 of the drawing, a specific embodiment of the present invention is depicted in detail. In particular, this embodiment is comprised of four padding components 90, 92, 94 and 96 (FIG. 13) bonded or fused together as depicted in the cross section of FIG. 13, and enveloped in a suitable fabric fire-blocking envelope 98 illustrated in a suitable embodiment such as the illustrated in FIGS. 23 and 24.

Note that the cushion is configured to have a bull nosed front 100 that is configured to fit over the front edge of a standard aircraft seat support structure (not shown). The side edges 101 in this embodiment are vertical. As further illustrated in FIG. 12, the bottom surface of the cushion is contoured as illustrated at 102 to include a thickened ischial protection pad adapted to fit into a mating depression formed in the seat cushion supporting structure. Note also that the rearmost edge of the cushion is bevelled as shown at 104 and the corners 106 are relieved to fit within the corresponding seat pan of the support.

As additionally shown in FIG. 12, several strips of hook or loop tape 108 are bonded to various surface areas of the cushion and will be used to affix the fire-block envelope to the cushion. Corresponding hook and loop strips are affixed to the interior surface of the fire-block fabric as illustrated in FIG. 24.

Referring again to FIG. 13, the cushion component parts are illustrated. All of these components are preferably made of Stimulite® honeycomb. The honeycomb components are each configured to meet a specific engineering specification. For example, component 90 is specified to have a high degree of firmness, component 92 is less firm, and components 94 and 96 have a firmness less than either of the other components. This insures that the passenger enjoys both safety and comfort as discussed above.

FIG. 14 is an inverted side elevational view of the embodiment of FIGS. 9, 10 and 12. For simplicity some of the hook and look strips are not shown.

FIGS. 15-19 illustrate details including a perspective view showing the previously described bottom surfaces and in addition, an extended side wall or skirt 110 of an alternative embodiment of the present invention. A cushion of this configuration would advantageously be used for seats at an end of a row.

FIGS. 20-22 illustrate details including a perspective view showing the previously described bottom surfaces and in addition, two extended side walls or skirts 112 of an alternative embodiment of the present invention. A cushion of this configuration would advantageously be used for stand-alone seats. 11

FIG. 23 shows the outside surface of a specially configured sheet of fire-block fabric 114 adapted to be wrapped about and secured to the outer surface of one of the above described cushion embodiments. As shown in FIG. 24 which depicts the opposite side 115 thereof, a plurality of hook and loop strips 116 are strategically positioned to engage the mating strips 108 positioned about the lower surface of the cushion.

The preceding description provides preferred exemplary embodiment(s) only, and is not intended to limit the scope, applicability, or configuration of the invention. Rather, the description of the preferred exemplary embodiment(s) is intended to provide those skilled in the art with an enabling description for implementing an embodiment. It is to be understood that various changes may be made in the function and arrangement of elements without departing from the true spirit and scope of the invention set forth in the appended claims.

The invention claimed is:

1. An aircraft seat cushion comprising:
   one or more base layers of a first seat cushion material or energy absorbing characteristic forming a supporting base layer, said supporting base layer having a bottom surface configured to conform to a particular type of rigid seat cushion support structure, said supporting base layer further having a generally planer top surface; and
   one or more energy absorbing upper layers of a second cushion material or energy absorbing characteristic made of perforated strips or ribbons of flexible, resilient, plastic material bonded together and expanded to form a honeycomb shaped core to which facing sheets of similar material are thermo-compression bonded to form a main cushioning layer having generally planer upper and lower surfaces, the main cushioning layer being bonded or otherwise fastened to the supporting base layer, the combination of said supporting base layer and main cushioning layer being enveloped in a removeable outer fabric cover.

2. An aircraft seat cushion as recited in claim 1, wherein the supporting base layer is tapered to be thicker in a front portion of the seat cushion than in a back portion of the seat cushion.

3. An aircraft seat cushion as recited in claim 2 wherein the front portion of said supportive base layer is bull-nosed and adapted to wrap about the front edge of a rigid seat cushion support structure.

4. An aircraft seat cushion as recited in claim 3 wherein said main cushioning layer includes a first component part having a first resilient characteristic suitable for supporting the buttocks and upper thighs of a user, and a second component part bonded to said first component part and adapted to having a second resilient characteristic suitable for supporting the lower thighs of the user, said second component part being configured to wrap around said bull-nosed front portion of said base layer.

5. An aircraft seat cushion as recited in claim 1, wherein the outer fabric cover is made of a fire-blocking material.

6. An aircraft seat cushion as recited in claim 1, wherein the main cushioning layer includes a centrally positioned honeycomb panel having a first resilient characteristic, and further includes a pair of honeycomb side panels having a second resilient characteristic, said side panels being bonded to said centrally positioned honeycomb panel.

7. An aircraft seat cushion as recited in claim 1, wherein said main cushioning layer includes a centrally positioned honeycomb panel having a first resilient characteristic, a pair of honeycomb side panels having a second resilient characteristic, and a third honeycomb panel spanning the rear edge of the centrally positioned honeycomb panel and having a third resilient characteristic.

8. An aircraft seat cushion as recited in claim 1, wherein at least one of the facing sheets of said main cushioning layer is perforated.

9. An aircraft seat cushion as recited in claim 1, wherein hook and loop fastening strips are affixed to the bottom surface of said base layer and to mating surfaces of one side of said outer fabric cover, said strips being used to fasten said cover to said combination of said supporting base layer and main cushioning layer when it is wrapped thereabout.

10. An aircraft seat cushion comprising:
    one or more layers of a first seat cushion material or support characteristic forming a supporting base layer having a bottom surface configured to conform to a particular type of rigid seat cushion support structure, said supporting base layer further having a generally planer top surface;
    one or more energy absorbing upper layers of a second cushion material or support characteristic made of perforated strips or ribbons of flexible, resilient, plastic material bonded together and expanded to form a honeycomb shaped core to which facing sheets of similar material are thermo-compression bonded to form a main cushioning layer having generally planer upper and lower surfaces, the main cushioning layer being bonded or otherwise fastened to the supporting base layer; and
    a removeable outer fabric cover removably enveloping the combination of said supporting base layer and said main cushioning layer.

11. An aircraft seat cushion as recited in claim 10, wherein a sheet or layer of foam material is bonded or otherwise affixed to the upper surface of said main cushioning layer and enveloped by said outer fabric cover.

12. An aircraft seat cushion as recited in claim 11, wherein the supporting base layer is tapered to be thicker in a front portion of the seat cushion than in a back portion of the seat cushion.

13. An aircraft seat cushion as recited in claim 12, wherein the outer fabric cover is made of a fire-blocking material.

14. An aircraft seat cushion as recited in claim 12 wherein the front portion of said base layer is bull-nosed and adapted to wrap about the front edge of a rigid seat cushion support structure.

15. An aircraft seat cushion as recited in claim 10, wherein the main cushioning layer includes a centrally positioned honeycomb panel having a first resilient characteristic, and further includes a pair of honeycomb side panels having a second resilient characteristic, said side panels being bonded to said centrally positioned honeycomb panel.

16. An aircraft seat cushion as recited in claim 10, wherein said main cushioning layer includes a centrally positioned honeycomb panel having a first resilient characteristic, a pair of honeycomb side panels having a second resilient characteristic, and a third honeycomb panel spanning the rear edge of the centrally positioned honeycomb panel and having a third resilient characteristic.

17. An aircraft seat cushion as recited in claim 10 wherein said main cushioning layer includes a first component part having a first resilient characteristic suitable for supporting the buttocks and upper thighs of a user, and a second component part bonded to said first component part and adapted to having a second resilient characteristic suitable for supporting the lower thighs of the user, said second component part being configured to wrap around said bull-nosed front portion of said base layer.

18. An aircraft seat cushion as recited in claim 10, wherein at least one of the facing sheets of said main cushioning layer is perforated.

19. An aircraft seat cushion as recited in claim 10, wherein hook and loop fastening strips are affixed to the bottom surface of said base layer and to mating surfaces of one side of said outer fabric cover, said strips being used to fasten said cover to said combination of said supporting base layer and main cushioning layer when said cover is wrapped thereabout.

20. An aircraft seat cushion as recited in claim 10, wherein hook and loop fastening strips are affixed to the top surface of said base layer and to mating surfaces of said cushioning layer so that at least one of said base layer and said cushioning layer can be separately removed, cleaned and/or replaced.

\* \* \* \* \*